United States Patent Office 2,800,509
Patented July 23, 1957

2,800,509
MAGNESIUM SULFATE DESICCANT IN SYNTHESIS OF PROPENE-1,3-DIAMINES

Richard C. Doss, Bartlesville, and Anton M. Schnitzer, Dewey, Okla., assignors to Phillips Petroleum Company, a corporation of Delaware No Drawing. Application April 8, 1955,
Serial No. 500,280

13 Claims. (Cl. 260—583)

This invention is directed to an improved method for the preparation of compounds of the propene-1,3-diamine series and more particularly to the use of magnesium sulfate as a dehydrating agent in this process.

It is well known that unsaturated diamines can be prepared by reacting saturated and unsaturated primary and secondary amines with alpha, beta-unsaturated aldehydes and ketones in the presence of certain desiccants; the latter serve to remove the water from the system as it forms and thus to shift the equilibrium in the direction of increased diamine production. For example, the reaction of acrolein and methacrolein with primary and secondary amines using potassium carbonate as a dehydrating agent is described in J. A. C. S. volume 74, pp. 2016–2018 (1952). U. S. Patent 2,565,529 discloses preparing compounds in the propene-1,3-diamine series from alpha, beta-unsaturated aldehydes and unsaturated allylic amines using non-acidic desiccants such as potassium carbonate, calcium oxide, magnesia, sodium sulfate, sodium carbonate, and calcium sulfate. The present invention is in the discovery that much higher yields can be attained in this reaction by the use of anhydrous magnesium sulfate as the dehydrating agent.

The reaction of this invention may be represented by the formula

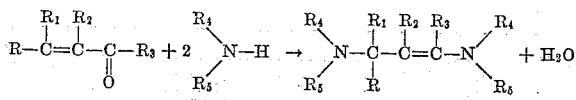

wherein each of the substituents R, R₁, R₂, and R₃ can be hydrogen or an alkyl, cycloalkyl, aryl, alkaryl, or aralkyl radical. R₄ can be hydrogen or an alkyl, cycloalkyl, alkenyl, aryl, alkaryl, or aralkyl radical, R₅ can be an alkyl, cycloalkyl, alkenyl, aryl, alkaryl, or aralkyl radical, and in the alkenyl group the double bond is not present between the apha and beta carbon atoms. The total number of carbon atoms in R, R₁, R₂, R₃, R₄ and R₅ does not exceed 30. Preferably R, R₁, R₂ and R₃ are hydrogen or a lower alkyl group such as methyl and/or ethyl, R₄ is hydrogen or a methyl, ethyl, or allyl radical, and R₅ is a methyl, ethyl, or allyl radical.

Amines which may be employed include methyl-, ethyl-, n-propyl-, isopropyl, allyl-, methallyl, dimethyl-, diethyl-, diisopropyl-, diallyl-, dimethallyl, cyclohexyl-, and diphenylamine, and aniline. Aldehydes which are applicable include acrolein, methacrolein, tiglaldehyde, crotonaldehyde, and cinnamaldehyde. Ketones which may be employed are methyl vinyl ketone, ethyl vinyl ketone, methyl isopropenyl ketone, mesityl oxide, and the like.

Among the compounds which may be prepared are N,N,N′,N′-tetramethyl-propene-1,3-diamine, N,N′-dimethyl-propene-1,3-diamine, N,N,N′,N′-tetraethyl-propene-1,3-diamine, N,N,N′,N′-tetramethyl-1-butene-1,3-diamine, N,N′-diethyl-(3-phenyl-1-propene)-1,3-diamine, N,N,N′,N′-tetramethyl-(2-methyl-1-butene)-1,3-diamine, and the like.

The reaction is generally effected in the presence of a solvent such as an ether, e. g., diethyl ether, methyl ethyl ether, dimethyl ether, or diisopropyl ether, or a hydrocarbon solvent such as benzene, toluene, xylene, pentane, hexane, methylcyclopentane, cyclohexane, methylcyclohexane, octanes, etc.

It is preferable to add the aldehyde or ketone to the amine, not vice versa. For example, acrolein would be added to dimethylamine; the reverse order results in rapid exothermic polymerization of acrolein. Since the presence of water cause degradation of propene-1,3-diamine by chemical reaction, it is advantageous to have magnesium sulfate present throughout the synthesis and to separate it from the crude product by means other than water washing.

In one method of operation, the amine is dissolved in the desired solvent and charged to the reactor either before or after the addition of magnesium sulfate. The temperature of the mixture is adjusted in the range between −25° and 35° C., preferably between −15° and 0° C. The aldehyde is dissolved in the same solvent used for the amine and this solution is added to the amine-magnesium sulfate mixture slowly with constant stirring. The reaction is exothermic, e. g., the initial addition of acrolein solution to dimethylamine solution evolves approximately 775±50 B. t. u. for each pound of acrolein added. The temperature is generally controlled by external cooling. Stirring is continued from 30 minutes to 30 hours.

An alternative method of operating comprises charging the amine solution to the reactor first, adjusting the temperature to the desired level, and then adding the aldehyde solution slowly with constant stirring. After all the aldehyde has been added, anhydrous magnesium sulfate is introduced and the reactants are stirred for 30 minutes to 30 hours.

The mol ratio of aldehyde to amine employed is generally in the range between 1:2 and 1:4 although it may go as high as 1:8. The mol ratio of aldehyde to magnesium sulfate is generally in the range between 1:0.15 to 1:1.5.

In a preferred method of operation, the temperature is adjusted in the range between −15° and 0° C., generally around −10° C., until all the aldehyde has been added. The reaction mixture containing aldehyde, amine, magnesium sulfate, and solvent is allowed to increase in temperature in the range between 20° and 35° C., preferably between 20° and 30° C., and stirring is continued as described above for a period in the range between 30 minutes and 30 hours.

At the conclusion of the reaction the mixture is filtered to remove magnesium sulfate, now at least in part in the hydrated form. The solvent is stripped from the filtrate and the crude product distilled. If the product is a solid, it can be purified by crystallization.

The compounds of this invention may be employed as pharmaceuticals and they serve as chemical intermediates for the preparation of other materials. Other uses are more fully described in a copending application of Mahan, Serial No. 366,381, filed July 6, 1953, same assignee.

EXAMPLE I

N,N,N′,N′-tetramethyl-propene-1,3-diamine was prepared by reacting acrolein with dimethylamine using magnesium sulfate as the dehydrating agent and methylcyclopentane as the solvent. Three runs were made using different mol ratios of aldehyde:MgSO₄. When carrying out each of these reactions, magnesium sulfate was charged to a reactor, provided with a stirrer and a means for external cooling, and dimethylamine dissolved in a portion of the methylcyclopentane was added. The temperature was adjusted to −10° C. and acrolein, dissolved in the remaining methylcyclopentane, was introduced slowly, with stirring, into the amine solution. After all of the acrolein had been added, the temperature was allowed to increase to 20–30° C. and the mixture was stirred at that temperature for 24 hours in two runs and 2 hours in the third run. The reaction mixture was filtered to remove magnesium sulfate, the filtrate was stripped to remove the solvent, and the product was distilled. The following table shows quantities of materials charged and results obtained:

*Table I*

| | Runs | | |
|---|---|---|---|
| | 1 | 2 | 3 |
| Acrolein, 91 percent pure: | | | |
| grams | 125 | 122 | 114 |
| mols | 2.03 | 1.98 | 1.85 |
| Dimethylamine: | | | |
| grams | 217.6 | 217.6 | 217.6 |
| mols | 4.82 | 4.82 | 4.82 |
| Methylcyclopentane: | | | |
| (for aldehyde), grams | 105 | 105 | 105 |
| (for amine), grams | 79 | 83 | 83 |
| Magnesium sulfate, anhydrous, reagent grade: | | | |
| grams | 212 | 49 | 80 |
| mols | 1.76 | 0.41 | 0.66 |
| Mol ratio aldehyde: amine | 1:2.4 | 1:2.4 | 1:2.4 |
| Mol ratio aldehyde:MgSO₄ | 1:0.9 | 1:0.2 | 1:0.36 |
| Time of stirring after addition of MgSO₄, hours | 24 | 24 | 2 |
| Yield, mol percent based on acrolein | 73.6 | 73.2 | 72.3 |

In each case the product distilled at 37–43° C. at a pressure of 5 mm. Hg. The refractive index was determined on run 1 and found to be 1.460±0.001.

Four runs were made similar to those given above except that sodium carbonate was used in three of them and potassium carbonate in the fourth instead of magnesium sulfate. Otherwise the procedure was the same and the product was recovered in the same manner. The quantities of materials charged and results obtained are shown in the following table:

*Table II*

| | Runs | | | |
|---|---|---|---|---|
| | 1 | 2 | 3 | 4 |
| Acrolein, 91 percent pure: | | | | |
| grams | 123.3 | 125 | 114 | 121 |
| mols | 2.00 | 2.03 | 1.85 | 1.96 |
| Dimethylamine: | | | | |
| grams | 227.8 | 224.4 | 224.4 | 211.6 |
| mols | 5.05 | 5 | 5 | 4.7 |
| Methylcyclopentane: | | | | |
| (for aldehyde), grams | 105 | 105 | 105 | 105 |
| (for amine), grams | 79 | 79 | 79 | 82 |
| Sodium carbonate, anhydrous: | | | | |
| grams | ¹212 | ²212 | ³212 | |
| mols | 2 | 2 | 2 | |
| Potassium carbonate, anhydrous, reagent grade: | | | | |
| grams | | | | 276 |
| mols | | | | 2 |
| Mol ratio aldehyde:amine | 1:2.5 | 1:2.5 | 1:2.7 | 1:2.4 |
| Mol ratio aldehyde:carbonate | 1:1 | 1:1 | 1:1.1 | 1:1 |
| Time of stirring after addition of sodium or potassium carbonate, hours | 24 | 24 | 24 | 24 |
| Yield, mol percent based on acrolein | 35 | 55.8 | 24.3 | 50 |

¹ Solvay soda ash.
² Baker's reagent grade.
³ Columbian Southern soda ash.

EXAMPLE II

N,N,N',N'-tetramethyl-propene-1,3-diamine was prepared from acrolein and dimethylamine using anhydrous magnesium sulfate as a dehydrating agent. Dimethylamine was dissolved in methylcyclopentane and charged to the reactor first, the temperature was adjusted to −10° C., and a solution of acrolein in methylcyclopentane was introduced slowly with stirring. The temperature was maintained at −10° C. and, after addition of the acrolein which required 25 minutes, anhydrous magnesium sulfate was introduced rapidly. The temperature was allowed to increase to 25–30° C. and the mixture was stirred at that temperature for two hours. The reaction mixture was filtered to remove magnesium sulfate, the filtrate was stripped to remove the solvent, and the product was distilled at 37–43° C. at a pressure of 5 mm. Hg. The following table shows quantities of materials charged and results obtained:

*Table III*

| | |
|---|---|
| Acrolein, 91 percent pure: | |
| Grams | 135 |
| Mols | 2.19 |
| Dimethylamine: | |
| Grams | 217.6 |
| Mols | 4.82 |
| Methylcyclopentane: | |
| (For aldehyde), grams | 105 |
| (For amine), grams | 83 |
| Magnesium sulfate, anhydrous, reagent grade: | |
| Grams | 80 |
| Mols | 0.66 |
| Mol ratio aldehyde:amine | 1:2.19 |
| Mol ratio of aldehyde:MgSO₄ | 1:0.3 |
| Yield, mol percent based on acrolein | 73.2 |

Two runs were made using calcium sulfate and sodium sulfate, respectively, instead of magnesium sulfate in the reaction of acrolein with dimethylamine in a cyclopentane solvent. Dimethylamine (45 parts by weight), 15 parts by weight of solvent, and the dehydrating agent were charged to a reactor and cooled to −10° C. Acrolein (24.6 parts by weight and 91% pure), dissolved in 22.5 parts by weight of solvent, was added dropwise to the amine mixture while the temperature was maintained at −10 to 0° C. and the reactants were stirred. Following addition of the aldehyde, the reaction mixture was allowed to warm slowly to 20–30° C. and agitation was continued for a total of 24 hours. The dehydrating agent was removed by filtration, the solvent was removed by vacuum flashing, and the crude product was distilled at 5 mm. Hg pressure. The quantities of materials charged in each run and the results obtained are shown in the following table:

*Table IV*

| | Runs | |
|---|---|---|
| | 1 | 2 |
| Acrolein, mols | 0.40 | 0.40 |
| Dimethylamine, mols | 1.0 | 1.0 |
| Calcium Sulfate, (Drierite, 10–20 mesh) mols | 0.60 | |
| Anhydrous Sodium sulfate, reagent grade, mols | | 0.40 |
| Yield, wt. percent of theory, based on acrolein used | 20.5 | 6.8 |

EXAMPLE III

N,N,N',N'-tetramethyl-1-butene-1,3-diamine was prepared by reacting crotonaldehyde with dimethylamine using magnesium sulfate as the dehydrating agent and methylcyclopentane as the solvent. Two runs were made. In the first run magnesium sulfate was charged to the reactor first, followed by a solution of dimethylamine in methylcyclopentane. The temperature was adjusted to −10° C. and a solution of crotonaldehyde in methylcyclopentane was added slowly with constant stirring. After the addition was complete, the temperature was allowed to increase to 20–30° C. and the mixture was stirred at that temperature for 24 hours. In the second run the amine solution was charged to the reactor first, the temperature was adjusted to −10° C., and the crotonaldehyde solution in methylcyclopentane was introduced slowly with stirring while the temperature was maintained at −10° C. The anhydrous magnesium sulfate was then added and the mixture brought slowly to a temperature of 20–25° C. and stirred for 1.5–2 hours. In each run the reaction mixture was filtered to remove magnesium sulfate, and the filtrate was stripped to remove the solvent. The product distilled at 45–48° C. under a pressure of 5 mm. Hg. It had a refractive index of 1.4666.

A third run was made using anhydrous potassium carbonate as the dehydrating agent instead of anhydrous magnesium sulfate. The procedure followed in run 2 was used with the reaction mixture being stirred at 20–30° C. for two hours following addition of the potassium carbonate. The product was recovered as described above. The quantities of materials charged in each run and the results obtained are shown below:

Table V

|  | Runs | | |
| --- | --- | --- | --- |
|  | 1 | 2 | 3 |
| Crotonaldehyde, 90 percent pure: | | | |
| grams | 64 | 368 | 418 |
| mols | 0.82 | 4.73 | 5.38 |
| Dimethylamine: | | | |
| grams | 115.6 | 700 | 600.4 |
| mols | 2.56 | 15.55 | 13.3 |
| Methylcyclopentane: | | | |
| (for aldehyde), grams | 67 | 300 | 300 |
| (for amine), grams | 52 | 262 | 262 |
| Magnesium sulfate, anhydrous, reagent grade: | | | |
| grams | 120 | 510 | -------- |
| mols | 1 | 4.24 | -------- |
| Potassium carbonate, anhydrous, reagent grade: | | | |
| grams | -------- | -------- | 600 |
| mols | -------- | -------- | 4.35 |
| Mol ratio aldehyde:amine | 1:3.12 | 1:3.3 | 1:2.4 |
| Mol ratio aldehyde:MgSO₄ | 1:1.22 | 1:0.9 | -------- |
| Mol ratio aldehyde:K₂CO₃ | -------- | -------- | 1:0.81 |
| Time of stirring after addition of MgSO₄, hours | 24 | 1.5–2 | -------- |
| Time of stirring after addition of K₂CO₃, hours | -------- | -------- | 2 |
| Yield, mol percent, based on crotonaldehyde | 92 | 86.4 | 70 |

We claim:

1. A method for preparing lower-alkyl-substituted unsaturated diamines which comprises reacting, in the presence of an anhydrous magnesium sulfate desiccant, a compound of the formula:

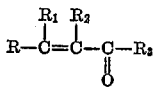

wherein R, R₁, R₂ and R₃ are selected from the group consisting of hydrogen and lower alkyl radicals, with an amine of the formula:

wherein R₄ is selected from the group consisting of hydrogen alkyl, cycloalkyl, alkenyl, aryl, alkaryl and aralkyl radicals and R₅ is selected from the group consisting of alkyl, cycloalkyl, alkenyl, aryl, alkaryl and aralkyl radicals, the double bond in the alkenyl radical being present other than between the alpha and beta carbon atoms.

2. The method of claim 1 in which R, R₁, R₂, and R₃ are hydrogens.

3. The method of claim 1 in which R is a methyl radical and R₁, R₂ and R₃ are hydrogens.

4. The method of claim 1 in which R, R₁ and R₂ are hydrogens and R₃ is a methyl radical.

5. The method of claim 1 in which R and R₁ are hydrogens and R₂ and R₃ are methyl radicals.

6. The method of claim 1 in which the mol ratio of the compound

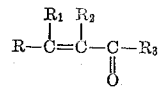

to amine is from about 1:2 to 1:4 and the mol ratio of the same compound to magnesium sulfate is from about 1:0.15 to 1:1.5.

7. The method of claim 6 in which the reaction is carried out in the presence of an organic solvent.

8. The method of claim 7 in which the reaction is carried out at a temperature in the range of −25° to +35° C.

9. A process for the preparation of N,N,N′,N′-tetramethyl-propene-1,3-diamine comprising reacting acrolein with dimethylamine using magnesium sulfate as a desiccant.

10. A process for the preparation of N,N,N′,N′-tetramethyl-1-butene-1,3-diamine comprising reacting crotonaldehyde with dimethylamine using magnesium sulfate as the desiccant.

11. A process for the preparation of N,N,N′,N′-tetramethyl-propene-1,3-diamine which comprises reacting dimethylamine with acrolein in the presence of anhydrous magnesium sulfate and an organic solvent, wherein the mol ratio of acrolein to dimethylamine is from about 1:2 to 1:4 and the mol ratio of acrolein to magnesium sulfate is from about 1:0.15 to 1:1.5, and said reaction being effected at a temperature in the range of −25° C. to +35° C.

12. A process for the preparation of N,N,N′,N′-tetramethyl-(1-methyl propene)-1,3 diamine comprising reacting methyl vinyl ketone with dimethylamine in the presence of magnesium sulfate and an organic solvent, wherein the mol ratio of methyl vinyl ketone to dimethylamine is from about 1:2 to 1:4 and the mol ratio of methyl vinyl ketone to magnesium sulfate is from about 1:0.15 to 1:1.5, and said reaction being effected at a temperature in the range of −25° C. to +35° C.

13. A process for the preparation of N,N,N′,N′-tetramethyl-(1,2 dimethyl propene)-1,3 diamine comprising reacting methyl isopropenyl ketone with dimethylamine in the presence of magnesium sulfate and an organic solvent, wherein the mol ratio of methyl isopropenyl ketone to dimethylamine is from about 1:2 to 1:4 and the mol ratio of methyl isopropenyl ketone to magnesium sulfate is from about 1:0.15 to 1:1.5, and said reaction being effected at a temperature in the range of −25° C. to +35° C.

References Cited in the file of this patent

UNITED STATES PATENTS 2,565,529    Smith _____ Aug. 28, 1951

OTHER REFERENCES

W. A. Puckner et al.: "Dried Magnesium Sulfate," Am. J. of Ph. (1911), vol. 83, pp. 263–264.

Encyclopedia of Chem. Technology, vol. 8, p. 615.

Weissberger, Ed.: "Technique of Organic Chemistry," vol. III, pub. by Interscience Publishers, Inc. (1950), p. 625.

Finch et al.: "Reactions of Acrolein and Related Compounds. VI—Condensations with Amines," J. A. C. S., pp. 2016–2018 (1952).